March 23, 1965
R. H. DYER ETAL
3,175,072
RESISTANCE WELDING APPARATUS
Filed July 2, 1962
3 Sheets-Sheet 1
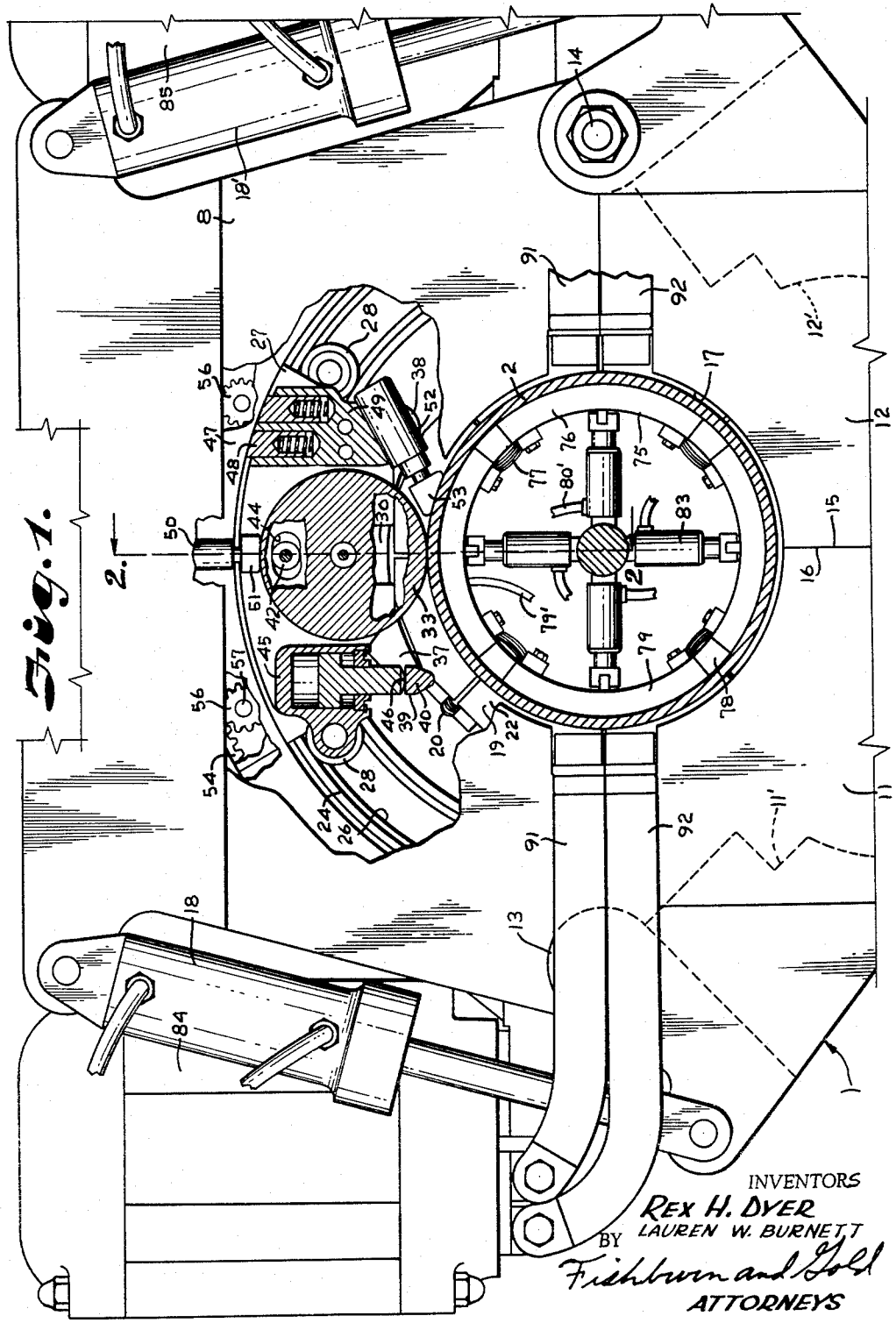
INVENTORS
*Rex H. Dyer*
BY *Lauren W. Burnett*
*Fishburn and Gold*
ATTORNEYS

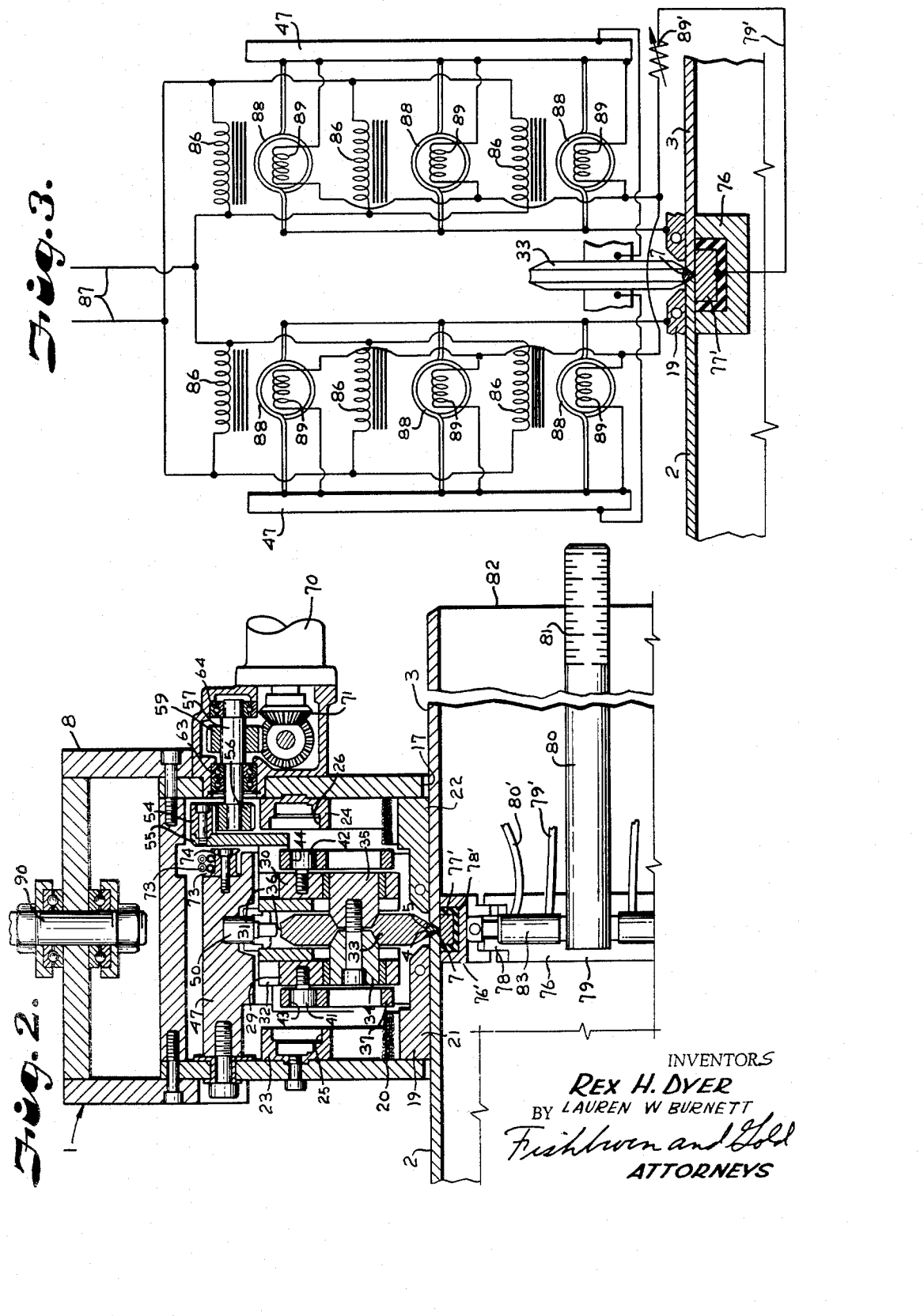

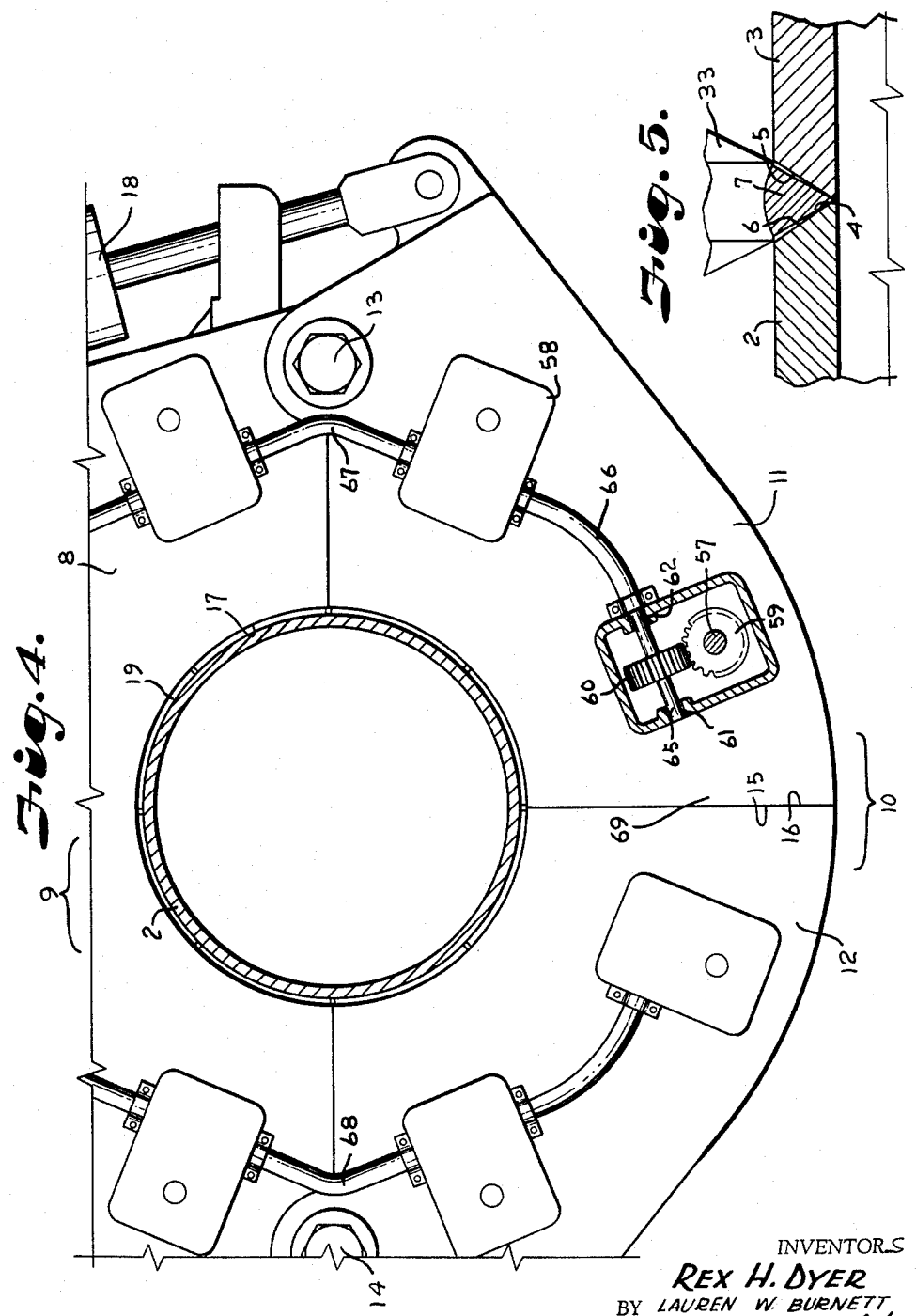

United States Patent Office 3,175,072
Patented Mar. 23, 1965

3,175,072
RESISTANCE WELDING APPARATUS
Rex H. Dyer and Lauren W. Burnett, Kansas City, Mo.
Filed July 2, 1962, Ser. No. 206,892
17 Claims. (Cl. 219—106)

This invention relates to resistance type welders, and more particularly to portable electric welding apparatus for joining sections of cylindrical pipe together.

The principal objects of the present invention are: to provide a portable resistance type pipe line welder adapted to be easily transported to the site of pipe laying; to provide such an apparatus which is adapted to clamp in adjacent abutting relation the circumferential edges of two pipe sections for welding said sections in place; to provide such an apparatus which helps align the abutting pipe section edges and maintain said alignment during the welding cycle; to provide such a pipe line welder wherein a carrier having a welding roller supported thereon is orbited 360 degrees about the pipe sections along adjacent edges being welded together; to provide such an apparatus which progressively welds sections of cylindrical pipe together along abutting circumferential beveled edges thereof which form an outwardly opening V-shaped groove supporting a pre-formed ring of welding wire therein; to provide such an apparatus which is quickly and easily opened to receive abutting pipe sections therein and yet supports the abutting edges of said pipe sections over substantially the entire circumference thereof when the apparatus is clamped closed; to provide such an apparatus which produces a superior weld seam consistently with a minimum of power and apparatus bulk; and to provide such a device which is simple in construction, requires a minimum of skill to operate and which is reliable in use.

Other objects and advantages of this invention will become apparent from the following description taken in connection with the accompanying drawings wherein are set forth by way of illustration and example certain embodiments of this invention.

FIG. 1 is a fragmentary view in front elevation with portions broken away showing apparatus embodying this invention in clamped condition about a section of pipe.

FIG. 2 is a cross-sectional view through the welding apparatus taken on the line 2—2, FIG. 1, particularly showing the relationship between the clamping members and the welding roller.

FIG. 3 is a schematic wiring diagram illustrating the electrical connection between power transformers and welding members in the apparatus.

FIG. 4 is a fragmentary view of the apparatus taken from the side opposite to that of FIG. 1 and particularly illustrating the drive synchronizing mechanism for the welding roller carrier.

FIG. 5 is a fragmentary cross-sectional view taken transversely of the weld on an enlarged scale showing the relationship of parts in the welding zone.

Referring to the drawings in more detail:

The reference numeral 1 generally indicates apparatus embodying this invention for progressively welding sections 2 and 3 of cylindrical pipe together along abutting circumferential beveled edges 4 and 5 respectively. The pipe sections 2 and 3 may be of large size for high pressure pipe line installation, for example 30 to 40 inches in inside diameter. The beveled edges 4 and 5, when abutted together, form an outwardly opening V-shaped circumferential groove 6 into which is placed a pre-formed ring 7 of welding wire. The ring 7 preferably has a cross-sectional periphery in the shape of a pie slice with a more acute angle than the groove 6 to prevent air entrapment in the groove and cause heating first at the root of the groove.

The apparatus 1 comprises a frame 8 having an upper substantially semi-circular ring section 9 and a lower substantially semi-circular ring section 10. The lower section 10 includes a pair of substantially quarter-circular jaws designated 11 and 12 respectively pivotally mounted at one end 13 and 14 respectively thereof to opposite ends of the upper ring section 9. The quarter-circular jaws 11 and 12 are adapted to selectively abut at the other ends 15 and 16 thereof forming with the upper ring section 9 a cylindrical passageway 17 extending through the frame 8 for removably receiving the pipe sections 2 and 3 in the frame 8 adjacent the beveled edges 4 and 5.

Hydraulic cylinders 18 and 18' respectively are connected between the upper section 9 and the quarter-circular jaws 11 and 12 for selectively pivoting said jaws away from each other as indicated by the broken lines 11' and 12' in FIG. 1 to provide access into the cylindrical passageway 17 and subsequently clamping the jaws 11 and 12 around the pipe sections 2 and 3.

A plurality of electrically conductive pipe clamping electrodes 19 are maintained electrically common, for example by means of flexible braided bus bars 20, and are secured on the frame 8 and positioned to form a pair of spaced-apart circumferentially extending rows 21 and 22, FIG. 2. The clamping electrodes 19 face and extend radially inwardly of the cylindrical passageway 17 when the jaws 11 and 12 are in clamping position about the pipe sections 2 and 3, and the clamping electrode rows 21 and 22 respectively circumferentially clampingly engage and electrically contact the pipe sections 2 and 3 adjacent the respective beveled edges 4 and 5 with the groove 6 and welding wire ring 7 spaced between said rows, FIG. 2.

A pair of facing oppositely positioned spaced wheel tracks 23 and 24 are secured to the frame 8 and respectively form circular guide grooves 25 and 26 extending coaxially about the cylindrical passageway 17 but on a larger diameter. The wheel tracks 23 and 24 are suitably broken in continuity to permit pivoting of the jaws 11 and 12 as noted above.

A carrier 27 has suitable wheels 28 rotatably mounted thereon and supported in the guide grooves 25 and 26 for guiding the carrier 27 in an orbital path about the cylindrical passageway 17. Spaced bearing blocks 29 and 30 respectively are supported in the carrier adjacent suitable guides 31 and 32 for radial movement toward and away from the cylindrical passageway 17. A welding roller 33 is supported on oppositely extending stud shafts 34 and 35 which are in turn rotatably mounted and supported in the bearing blocks 29 and 30. The welding roller 33, in the illustrated example, has a peripheral configuration 36 which is concave to produce a convex bead in the weld seam.

A lever 37 is pivotally mounted at one end 38 thereof to the carrier 27 and terminates at the other end 39 thereof in a platen 40. Cam roller bearings 41 and 42 respectively are threadedly engaged in the bearing blocks 29 and 30 and extend outwardly thereof and into receiving slots 43 and 44 respectively formed in the lever 37. The cam roller bearings 41 and 42 provide a structural connection for transmitting force between the lever 37 and the bearing blocks 29 and 30. A remote controlled extensible member or hydraulic cylinder 45 is secured at one end thereof to the carrier 27 and is adapted to selectively apply force at 46 to the platen 40 for urging the lever 37 downwardly, as illustrated in FIG. 1, which in turn urges the welding roller 33 radially inwardly of the cylindrical passageway 17 by pressure on the bearing blocks 29 and 30.

An electrically conductive slip ring 47 is mounted on the frame 8 and extends coaxially of the cylindrical passageway 17 but on a diameter greater than the diameter of the guide grooves 25 and 26 when the jaws 11 and 12 are in clamping position, as illustrated in FIG. 1. Current-transmitting spring-loaded brushes 48 are supported in a suitable retainer 49 secured to the carrier 27. The brushes 48 are electrically common with the welding roller 33 through the bearing blocks 29 and 30 and are adapted to maintain sliding contact with the slip ring 47 during the orbiting of the carrier 27 as described more fully hereinafter.

A reciprocating hammer 50, preferably air driven, is mounted on the carrier 27 directly above the welding roller 33 and has a convex striking member 51 shaped to be received over a large area on the peripheral configuration 36 of the welding roller 33. The hammer 50 periodically reciprocates to provide an inwardly radially directed blow to the welding roller which is transmitted to the welding wire ring 7 during the welding operation to aid in producing weld integrity. A second reciprocating hammer 52 is secured to the carrier 27 in trailing position with respect to the welding roller 33 and has an anvil or striking member 53 which periodically directs blows to the welding wire or weld after passage thereover by the welding roller 33 and while the weld is still in a partially plastic state.

A carrier drive member, in the illustrated example an internal ring gear segment 54, is suitably secured by a radial arm 55 to the carrier 27 and is positioned coaxially of the cylindrical passageway 17. A driving mechanism, in the illustrated example a plurality of drive pinions 56, is respectively mounted on shafts 57 which are rotatably supported on the frame 8 and positioned in circumferentially spaced relation coaxially about the cylindrical passageway 17 as best illustrated in FIG. 4. The drive pinions 56 are circumferentially spaced apart a distance less than the circumferential length of the ring gear segment 54 and are adapted to sequentially mesh therewith during the orbiting of the carrier 27. In other words, the spacing of the drive pinions 56 is such that at least one is always meshed with the ring gear segment 54 in order that no motion can be experienced by the ring gear segment 54 unless there is a corresponding rotation of at least one of the drive pinions 56.

Circumferentially spaced gear boxes 58 surround respective mating sets of spiral gears 59 and 60 and provide support for shaft bearings 61, 62, 63 and 64. The spiral gears 59 are respectively mounted on the shafts 57 which are rotatably supported in the shaft bearings 63 and 64. The spiral gears 60 which mesh with the gears 59 are mounted on stub shafts 65 rotatably supported in the shaft bearings 61 and 62 and operatively connected to each other by means of flexible drive shafts 66. The drive pinions 56 are thus operatively connected together for synchronized rotation. It is noted that when the quarter-circular jaws 11 and 12 are pivoted away from each other to permit the entrance or exit of the pipe sections 2 and 3, the flexible drive shafts are permitted to bend at 67 and 68 whereby the relative positions of the various drive pinions 56 are maintained. It is further noted that no flexible drive shaft is required at 69 where the jaws 11 and 12 separate since continuity is provided through the interconnected flexible drive shafts 66 extending in opposite directions therefrom about the frame 8.

A reversible orbit motor 70 is secured to the frame 8 and is adapted to drive a bevel gear 71 which is meshed with a bevel gear 72 fixed to a stub shaft 65 for driving the pinions 56 and producing the orbiting of the carrier 27 in the guide grooves 25 and 26. Suitable hoses 73 containing hydraulic fluid, air, and if desired cooling fluids under pressure, are respectively connected to the hammers and hydraulic cylinder and cooling passageways (not shown) in the carrier 27 and are adapted to be pulled into a circular passageway 73' adjacent the slip ring 47 as the carrier 27 orbits about the cylindrical passageway 17. Upon rotating 360 degrees, the direction of orbiting may be reversed by reversing the orbit motor 70 and the hoses 73 continuously withdrawn as the carrier 27 again approaches the beginning position thereof. Suitable rollers 74 guide the hoses 73 about the frame 8 in the passageway 73' with a minimum of frictional resistance.

An internal mandrel 75 comprises a plurality of electrode segments 76 which are maintained electrically common by means of suitable braided bus bars 77. The electrode segments 76 are maintained in structural relation by means of interfitting fingers 78 located respectively at opposite ends thereof and the segments 76 together form a collapsible ring 79 adapted for insertion into one of the cylindrical pipe sections, in the illustrated example the section 3. The segments 76 are comprised of a heavy support jacket 76' preferably of structural steel and electrical contact portions 77' of a more conductive metal. Insulating material 78' separates the jacket 76' and the portions 77'. The internal mandrel 75 includes a calibrated push rod 80 having suitable position markings 81 thereon by which the internal mandrel 75 may be located adjacent the groove 6 by reference to the open end 82 of the pipe section 3. A plurality of radially extending hydraulic cylinders 83 are respectively connected to the electrode segments 76 and are adapted to expand the internal mandrel into physical and electrical contact with the pipe sections adjacent to and on opposite sides of the groove 6 as best illustrated in FIG. 2. Electrical power to the segments 76 and hydraulic fluid are respectively carried to the mandrel 75 by a suitable cable 79' and hoses 80'.

Suitable intermittent duty, preferably circulating liquid-cooled transformers 84 and 85, are, in the illustrated example, supported on the frame 8 and each has a plurality of parallel connected primary windings designated 86 connected to a source of electrical energy 87, for example 220 volts, 300 cycle A.C. Each of the primary windings 86 has associated therewith a first secondary winding 88 and a second secondary winding 89. The first secondary windings 88 are connected in parallel between the slip ring 47 and the pipe clamping electrodes 19, and are composed of very few turns of heavy wire or bar for transmitting very high current flow at relatively low voltage. The second secondary windings 89 have a greater number of turns and are of lighter current-carrying construction (higher resistance) than the first secondary windings 88 and are connected in parallel between the electrode segments 76 and the slip ring 47. A variable resistance 89' is inserted in the circuit of the secondary windings 89. The electrical pathways above-described produce a heavy current flow between the welding roller 33 and the pipe clamping electrodes 19 and a lesser variable current flow between the electrode segments 76 and the welding roller 33, the latter flow having been found to selectively concentrate the former or high current flow in the weld area to produce a higher quality weld more rapidly with less total current flow. The mechanism by which this occurs is not clearly understood, however, it is believed that the second or lesser current flow narrows the path or cross-sectional area of the first current flow through the melting metal for producing more localized heating in the groove 6.

By way of operation, the apparatus 1 may be conveniently carried by means of a suitable swivel joint member 90 on a crane or tractor boom or the like (not shown) to the place where the pipe sections are to be welded together. The pipe sections are first prepared by beveling to provide the groove 6 therebetween upon abutment and the pre-formed welding wire ring 7 is placed in said groove. The apparatus 1 is positioned directly over the groove and the jaws 11 and 12 are pivoted away from each other enabling the apparatus to receive the pipe sections therein. The jaws are closed clamping the pipe sections in the cylindrical passageway 17 and also aligning the pipe sections with respect to each other. The internal mandrel 75 may be concurrently or subsequently inserted in the pipe sections and expanded in alignment with the groove 6 to help maintain the pipe sections in alignment and also provide electrical contact for the secondary current flow noted above. Electrical power and hydraulic pressure and air pressure may then be applied to the transformers, to the orbiting motor 70 and to the respective hammers 50 and 52 and cylinder 45, whereby the welding wire ring 7 is progressively melted into and forms a weld with the respective edges 4 and 5 as the welding roller 33 progresses about the pipe sections. After traveling 360 degrees about the pipe sections, the orbiting motor 70 may be reversed and the power to the transformers and hydraulic pressure and air pressure cut off whereby the carrier 27 is reversed in direction of travel until the begining position thereof is reached. The jaws 11 and 12 are then opened and the apparatus is removed from the pipe sections for transporting to a place where another weld is required.

It is to be understood that the transformers 84 and 85 are illustrated as connected to the frame 8 and electrically connected in the apparatus by means of heavy bus bars or cables 91 and 92; however, if desired, the transformers may be maintained physically separated from but electrically connected in the same manner to said frame.

It is to be further understood that while one form of this invention has been illustrated and described, it is not to be limited to the specific form or arrangement of parts herein described and shown except insofar as such limitations are included in the claims.

What we claim and desire to secure by Letters Patent is:

1. Apparatus for progressively welding sections of cylindrical pipe together along abutting circumferential edges with welding wire therebetween, said apparatus comprising:
   (a) a frame including sections forming a ring with a cylindrical passageway therethrough, one of said sections comprising at least one jaw adapted to open and close for removably receiving said pipe sections in said cylindrical passageway, means for selectively opening said jaw and clampingly closing said jaw on said pipe section,
   (b) a plurality of electrodes associated with said frame and positioned to electrically contact said pipe sections adjacent said respective circumferential edges with said welding wire spaced between said electrodes,
   (c) a carrier associated with said frame, means on said frame for guiding said carrier in an orbital path about said cylindrical passageway, a welding roller, bearing means for rotatably supporting said welding roller in said carrier and permitting movement of said welding roller inwardly of said cylindrical passageway, said welding roller having a peripheral configuration for forming said welding wire into a weld, means adapted to selectively apply force to said welding roller for urging same inwardly of said cylindrical passageway and against said welding wire while said carrier is in said orbital path, conductive means for transmitting electrical energy to said welding roller while said carrier is in said orbital path,
   (d) a driving member secured to said carrier, a driving mechanism on said frame and adapted to engage said driving member for selectively driving said carrier in said orbital path,
   (e) an internal mandrel comprising a plurality of segments forming a ring adapted for insertion into an open end of one of said cylindrical pipe sections, at least one force producing member operatively associated with said electrode segments and adapted to selectively expand said internal mandrel into supporting contact with said pipe sections adjacent said abutting edges, and
   (f) a source of electrical energy connected between said conductive means and said electrodes, whereby upon clamping said frame on said pipe sections said carrier is orbitable about said sections for progressively forming a weld.

2. The apparatus of claim 1 wherein:
   (a) said frame has an upper substantially semi-circular ring section and a lower substantially semi-circular ring section, said lower section including a pair of substantially quarter-circular jaws pivotally mounted at one end respectively thereof to said upper section, said jaws being adapted to selectively abut and separate at the other ends thereof for removably receiving said pipe sections.

3. The apparatus of claim 1 wherein:
   (a) said electrodes are pipe clamping electrodes secured on said frame and positioned to form a pair of spaced-apart circumferentially extending rows,
   (b) said clamping electrode rows being adapted to respectively circumferentially clampingly engage and electrically contact said pipe sections adjacent said respective pipe edges with said welding wire spaced between said clamping electrode rows.

4. The apparatus of claim 1 wherein said means for guiding said carrier comprises:
   (a) a pair of facing oppositely positioned spaced wheel tracks secured to said frame and respectively forming circular guide grooves coaxial with said cylindrical passageway,
   (b) said carrier having wheels engaged in said guide grooves for guiding said carrier.

5. The apparatus of claim 1 wherein said means adapted to selectively apply force to said welding roller comprises:
   (a) a lever pivotally mounted at one end thereof on said carrier and terminating at the other end thereof in a platen,
   (b) bearing members extending between and engaging said lever and bearing means for transmitting force therebetween, and
   (c) a remote controlled extensible member secured at one end thereof to said carrier and adapted to selectively apply force to said platen for urging said welding roller inwardly of said cylindrical passageway.

6. The apparatus of claim 1 wherein said conductive means for transmitting electrical power to said welding roller comprises:
   (a) an electrically conductive slip ring on said frame and extending coaxially with said cylindrical passageway when said jaw is in clamping position,
   (b) current-transmitting spring-loaded brushes on said carrier, said brushes being electrically common with said welding roller and adapted to maintain sliding contact with said slip ring during the orbiting of said carrier.

7. The apparatus of claim 1 including:
   (a) a reciprocating hammer mounted on said carrier and adapted to periodically provide a blow to said welding roller in a direction for periodically urging said welding roller forcefully against said welding wire.

8. The apparatus of claim 1 including:
   (a) a reciprocating hammer mounted on said carrier in trailing position with respect to said welding roller,
   (b) said hammer being adapted to periodically provide a blow directly to said welding wire after passage thereover by said welding roller.

9. The apparatus of claim 1 wherein said driving member secured to said carrier and said driving mechanism comprise:
   (a) a gear segment positioned coaxially of said cylindrical passageway,
   (b) a plurality of drive pinions on said frame and positioned in circumferentially spaced relation coaxially about said cylindrical passageway, (c) said drive pinions being circumferentially spaced apart a distance less than the circumferential length of said gear segment and adapted to sequentially mesh therewith during the orbiting of said carrier, (d) means operatively connected to each other and to said drive pinions and adapted to synchronize the rotation of said pinions, and (e) an orbit motor secured to said frame and adapted to selectively drive said pinions for orbiting said carrier.

10. The apparatus of claim 1 wherein said internal mandrel includes:

(a) a calibrated push rod by which said segments are located adjacent said pipe section edges by reference to said pipe section open end.

11. The apparatus of claim 1 wherein:

(a) said internal mandrel segments form electrically common electrode members adapted to provide electrical contact with said pipe sections, and (b) a source of electrical energy is connected between said internal mandrel segments and said conductive means.

12. The apparatus of claim 11 wherein said sources of electrical energy comprise:

(a) at least one transformer having a plurality of parallel connected primary windings, a source of electrical current connected across said primary windings, (b) a first secondary winding and a second secondary winding for each of said primary windings, (c) said first secondary windings being connected in parallel between said conductive means and said electrodes, said second secondary windings having a greater number of turns than said first secondary windings and being connected in parallel between said internal mandrel segments and said conductive means.

13. In a machine for progressively welding metal sections together along abutting edges thereof, said sections having an outer surface and an inner surface, said apparatus comprising:

(a) electrically conductive clamping members in clamping electrically contacting relation on said outer surface and spaced apart on opposite sides of and adjacent said abutting edges, (b) a welding contactor positioned between said clamping members and adapted to progressively contact said metal sections longitudinally adjacent said abutting edges, (c) an electrode contacting said inner surface adjacent said abutting edges and having at least a portion thereof opposite said welding contactor, (d) means for impressing a first current flow between said clamping members and said welding contactor, and (e) means for impressing a second current flow between said electrode and said welding contactor, (f) whereby said second current flow alters said first current flow for producing highly localized heating adjacent said abutting edges.

14. The machine of claim 13 wherein:

(a) said second current flow is less than said first current flow.

15. The method of progressively welding metal pipe sections together along abutting circumferential edges thereof, said sections having an outer surface and an inner surface, said method comprising:

(a) clamping said sections in aligned relation, (b) electrically contacting said sections on said outer surface in positions spaced apart on opposite sides of and adjacent said abutting edges, (c) urging a welding wire ring into electrical contact with said abutting edges, urging a welding contactor into electrical contact with said wire ring, (d) impressing electrical energy between the outer surface contacted positions on said sections and said welding contactor, and (e) orbiting said welding contactor about said pipe sections.

16. In apparatus for welding two sections of cylindrical metal pipe together along adjacent circumferential edges:

(a) a frame having a cylindrical passageway therethrough, said frame including a jaw adapted to open and close for removably receiving said sections in said passageway, circular guide means carried by said frame and transversely surrounding the sections in said passageway when said jaw is closed, (b) a carrier associated with said frame and engaging said guide means for movement in a circular path about said sections guided by said guide means, (c) a driving member associated with said frame and engaging said carrier for driving said carrier in said circular path, (d) an electrode for electrically contacting at least one of said sections at a position spaced from said edges, and (e) current transmitting means carried by said carrier for movement therewith in a circular path adjacent said edges upon operation of said driving member, said current transmitting means electrically communicating through said one section with said electrode for producing a circular path progressing weld area along said edges.

17. The method of progressively welding metal pipe sections together along abutting circumferential edges thereof, said sections having an outer surface and an inner surface, said method comprising:

(a) clamping said sections in aligned relation, (b) electrically contacting said sections on said outer surface in positions spaced apart on opposite sides of and adjacent said abutting edges, (c) urging a welding wire into electrical contact with said abutting edges, urging a welding contactor into electrical contact with said wire, (d) electrically contacting said sections in positions adjacent said abutting edges on said inner surface, (e) impressing electrical energy between the outer surface contacted positions on said sections and said welding contactor, (f) impressing electrical energy between said inner surface contacted positions and said welding contactor, and (g) orbiting said welding contactor about said pipe sections.

References Cited in the file of this patent

UNITED STATES PATENTS

| | | |
|---|---|---|
| 456,541 | Wiegand | July 21, 1891 |
| 1,674,109 | Grob | June 19, 1928 |
| 1,873,847 | Miller | Aug. 23, 1932 |
| 1,880,095 | Ledwinka | Sept. 27, 1932 |
| 1,978,178 | Taylor | Oct. 23, 1934 |
| 2,005,912 | Drake | June 25, 1935 |
| 2,281,805 | Schenk | May 5, 1942 |
| 2,721,248 | Kirkpatrick | Oct. 18, 1955 |
| 2,903,566 | Launder et al. | Sept. 8, 1959 |

FOREIGN PATENTS

| | | |
|---|---|---|
| 854,475 | France | Jan. 19, 1940 |